Patented Jan. 10, 1950

2,494,513

UNITED STATES PATENT OFFICE 2,494,513

SURFACE TREATED ETHYLCELLULOSE ARTICLES AND PROCESS OF MAKING SAME

Earle L. Kropscott, Midland, and Paul H. Lipke, Midland County, Mich., assignors to The Dow Chemical Company, Midland, Mich., a corporation of Delaware No Drawing. Application August 27, 1947, Serial No. 770,950

4 Claims. (Cl. 117—145)

This invention concerns an improvement in the surface appearance of parts formed of compositions comprising ethylcellulose and cellulosic fibers.

Fillers of various types are frequently employed in molding compositions comprising organic plastics. For many purposes, formulations comprising ethylcellulose and cellulosic fibers are particularly advantageous both as to mechanical properties and from the standpoint of cost. However, cellulosic fibers are not readily wetted by ethylcellulose, and parts formed from formulations containing these materials frequently are non-lustrous in appearance due to exposed fibers at the surface. This is particularly noticeable when the processes of fabrication involve steps such as sawing, cutting, and tumbling.

In general, the aforesaid defect may be remedied to some extent by mechanically embedding said fiber ends in the plastic. Another remedial measure involves the application of a lacquer or varnish to the surface. Such corrective measures involve considerable time and labor, and the treated surface lacks permanency.

It is an object of this invention to produce a permanent, uniformly lustrous appearing surface on a part formed from ethylcellulose containing cellulosic fibers as a filler. Other objects will be apparent from the following description.

In accordance with a preferred form of the present invention, a liquid polymeric alkyl siloxane containing an average of from 1.85 to 2.2 alkyl radicals, preferably methyl radicals, per silicon atom, is applied to the surface of a body of ethylcellulose containing cellulosic fibers as a filler and having exposed fibers on such surface to impart a permanently lustrous and uniform appearance to said surface.

Liquid polymeric alkyl siloxanes which are suitable for the purposes of this invention are available commercially, and have been described in the art. They may be prepared by any of a variety of processes. Illustrative methods for preparing liquid alkylsiloxanes are described in U. S. Patents 2,382,082 and 2,384,384, and products so obtained are satisfactory for the present purposes.

Molding compositions with which this invention is concerned are based on medium ethoxy ethylcellulose, that is, ethylcellulose having an ethoxyl content of about from 45 to 47 per cent, as the major constituent. The ethylcellulose may be suitably modified with a plasticizer of the conventional type, such as phthalates or triphenyl phosphate. Conventional pigments or dyes are generally incorporated in the formulation, usually in amount approximating one per cent by weight or less of the total composition. Examples of such coloring materials include oil-soluble dyes, lead chromate, zinc chromate, titanium dioxide, copper phthalocyanine, iron oxide and carbon black.

The filler, which usually constitutes from 5 to 15 per cent by weight of the molding composition, may be any of several types of materials of cellulosic origin, such as paper, cotton fibers, or wood flour.

The liquid polymeric alkylsiloxane may be applied to the plastic surface by any conventional method such as by spraying, brushing, or dipping. Because ethylcellulose tends to be compatible with organic solvents and oils, the use of diluents for the alkyl siloxane is somewhat limited. However, the application may be satisfactorily and economically made from an aqueous emulsion of the siloxane. In the latter instance, it is preferred to employ an emulsion containing at least 0.5 per cent by weight of the siloxane. Water is subsequently removed by volatilization leaving a permanently lustrous finish on the surface of the plastic.

The visual result obtained by the process of this invention is much the same as that observed when the exposed fibers are wet with water, but differs from the latter in that the effect is a permanent one. The fibers remain exposed, but no longer have the grayish appearance of untreated fibers. In other words, the process of this invention does not constitute a polishing or a coating operation, but would appear to be an impregnation of the exposed fibers with the alkyl siloxane.

The following example is illustrative of one mode of carrying out the invention, but is not to be construed as limiting its scope.

A molding composition was prepared by combining 74 parts by weight of medium ethoxy ethylcellulose, 16 parts of alpha-methyl styrene and 10 parts of cellulose fibers. The material was divided into four parts, and carbon black was added to each in amount of 0.5 per cent, 1.0 per cent, 5.0 per cent and 10.0 per cent by weight, respectively, and intimately mixed therewith.

The pigmented compositions were extrusion molded, cut into button-like forms, and a character stamped into the cut surface of each part. A white paint was applied to fill the intaglio. When the paint was copletely dry, the parts were tumbled with water, pumice and small pebbles, to remove excess paint and flash. The parts were then washed free of abrasive and examined. In each instance the buttons exhibited a dull gray color which detracted from the appearance of the white intaglio. Apparently the amount of carbon black present had little influence upon the overall blackness of the plastic background.

The parts were then dipped into an aqueous emulsion containing 0.5 per cent by weight of 1000 centistoke liquid polymeric dimethylsiloxane and allowed to dry in air. The parts so treated had a uniformly black background, against which the white intaglio was sharply defined, regardless of the amount of carbon black present.

What is claimed is:

1. The process which comprises applying a liquid polymeric alkyl siloxane, containing an average of from 1.85 to 2.2 alkyl radicals per silicon atom, to a surface of a body formed from ethylcellulose containing cellulosic fibers as a filler and having exposed cellulosic fibers on said surface, to impart a lustrous and uniform appearance to said surface.

2. The process which comprises applying a liquid polymeric methyl siloxane, containing an average of from 1.85 to 2.2 methyl radicals per silicon atom, to a surface of a body formed from ethylcellulose containing cellulosic fibers as a filler, and having exposed cellulosic fibers on said surface, to impart a lustrous and uniform appearance to said surface.

3. In the manufacture of parts from compositions comprising plasticized medium ethoxy ethylcellulose, cellulosic fibers and a pigmenting agent, the improvement which comprises treating a surface of said part having exposed cellulosic fibers thereon with a liquid polymeric methyl siloxane containing an average of from 1.85 to 2.2 methyl radicals per silicon atom to impart a uniformly lustrous appearance to said surface.

4. An article of manufacture comprising a body of ethylcellulose containing cellulosic fibers as a filler, a surface of said body having exposed cellulosic fibers thereon, said exposed fibers being wet with a liquid polymeric methyl siloxane containing an average of from 1.85 to 2.2 methyl radicals per silicon atom.

EARLE L. KROPSCOTT.
PAUL H. LIPKE.

REFERENCES CITED

The following references are of record in the file of this patent:

UNITED STATES PATENTS

| Number | Name | Date |
|---|---|---|
| 2,258,218 | Rochow | Oct. 7, 1941 |